United States Patent
Wagner (10) Patent No.: US 8,321,336 B2
(45) Date of Patent: *Nov. 27, 2012

(54) SYSTEMS AND METHODS RELATED TO LIFETIME MORTGAGES

(75) Inventor: Gerald C. Wagner, Alameda, CA (US)

(73) Assignee: Ibis Software Corporation, Alameda, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/168,612

(22) Filed: Jun. 24, 2011

(65) Prior Publication Data

US 2011/0258097 A1    Oct. 20, 2011

Related U.S. Application Data

(63) Continuation of application No. 11/943,498, filed on Nov. 20, 2007, now Pat. No. 7,974,917.

(60) Provisional application No. 60/866,574, filed on Nov. 20, 2006.

(51) Int. Cl.
*G06Q 40/00* (2006.01)
(52) U.S. Cl. .................................................. 705/38
(58) Field of Classification Search .................. 705/35, 705/37, 38
See application file for complete search history.

(56) References Cited

U.S. PATENT DOCUMENTS

| | | | |
|---|---|---|---|
| 5,689,649 A | 11/1997 | Altman et al. | |
| 5,903,879 A | 5/1999 | Mitchell | |
| 5,991,745 A * | 11/1999 | Kiritz | 705/38 |
| 6,012,047 A | 1/2000 | Mazonas et al. | |
| 6,985,886 B1 * | 1/2006 | Broadbent et al. | 705/38 |

\* cited by examiner

*Primary Examiner* — Ojo O Oyebisi (74) *Attorney, Agent, or Firm* — Knobbe, Martens, Olson & Bear, LLP (57) ABSTRACT

The present invention relates to a mortgage having a forward portion and a reverse portion. In the forward portion, the borrower receives a loan from a lender in order to purchase a property, such as a home. In the reverse portion, the property has accumulated sufficient equity to enable the lender to disburse funds back to the borrower. The present disclosure describes various computer systems and computer-implemented methods that assist in planning for this type of mortgage. Various factors may be considered, such as, the initial loan principal, ages of one or more borrowers, and a desired mortgage interest rate, and calculates. Different scenarios for conversion from the forward portion to the reverse portion of the mortgage may then be calculated and presented. For example, one or more forward mortgage payment schedules may be calculated and future reverse mortgage capacity may be presented. In some embodiments, the reverse mortgage capacity is used to pay some or all of the forward mortgage portion.

4 Claims, 8 Drawing Sheets

| Index | Single Equiv. |
|---|---|
| 20000 | 0 |
| 55055 | 50 |
| 55057 | 51 |
| 55061 | 52 |
| 55066 | 53 |
| 55086 | 54 |
| 55056 | 51 |
| 55058 | 52 |
| 55062 | 53 |
| 55067 | 54 |
| 55087 | 55 |
| 55057 | 52 |
| 55059 | 53 |
| 55063 | 54 |
| 55068 | 55 |
| 55088 | 56 |
| 55089 | 53 |
| 94094 | |
| 94096 | 91 |
| 94100 | 92 |
| 94103 | 93 |
| 95095 | 91 |
| 95097 | 92 |
| 95100 | 93 |
| 95104 | 94 |
| 96096 | 91 |
| 96098 | 92 |
| 96101 | 93 |
| 96104 | 94 |
| 97097 | 93 |
| 97099 | 94 |
| 97102 | 95 |
| 98098 | 94 |
| 98100 | 95 |
| 99099 | 95 |
| 100100 | 95 |

LIFETIME MORTGAGE CALCULATOR

420:
| | |
|---|---|
| Home Value | $350,000 |
| Initial Loan to Value | 80% |
| Current Age Youngest | 40 |
| Current Age Oldest | 45 |
| Desired Years Until Conversion | 18 |

430:
| | |
|---|---|
| Current Interest Rate | 6.00% |
| Future Annual Home Appreciation | 3.00% |
| Future 10-Year Treasury Rate | 7.00% |

440:
| | |
|---|---|
| Initial Mortgage Balance | $280,000 |
| Monthly Payment Options: | |
| Interest Only | 1,400 |
| 30-yr Payments | 1,679 |
| 15-yr Payments | 2,363 |
| Minimum Yrs. Before Conversion | 15 |
| Payment Needed to Meet [18yr] Goal | 1,694 |

410 encompasses all sections above.

| Borrower Age | Reverse PLF | 3.00% Home Appreciation | Reverse Capacity | Forward Payment Needed |
|---|---|---|---|---|
| 55 | 0.1133 | 289,819 | 32,850 | 3,396 |
| 60 | 0.1675 | 335,979 | 56,266 | 1,877 |
| 65 | 0.2216 | 389,500 | 86,309 | 1,391 |
| 70 | 0.2917 | 451,528 | 131,707 | 1,148 |
| 75 | 0.3640 | 523,444 | 190,524 | 1,014 |
| 80 | 0.4193 | 606,816 | 254,429 | 946 |
| 85 | 0.4985 | 703,466 | 350,646 | 894 |
| 90 | 0.5443 | 815,509 | 443,319 | 878 |

SYSTEMS AND METHODS RELATED TO LIFETIME MORTGAGES

PRIORITY CLAIM

This application claims priority to and is a continuation of U.S. application Ser. No. 11/943,498, filed Nov. 20, 2007 and titled SYSTEMS AND METHODS RELATED TO LIFETIME MORTGAGES, which claims the benefit of priority under 35 U.S.C. §119(e) of U.S. Provisional Application No. 60/866,574, filed on Nov. 20, 2006 and titled LIFETIME MORTGAGE SYSTEM, the entireties of both of which are hereby incorporated herein by reference.

FIELD OF THE INVENTION

The present disclosure relates generally to the field of mortgages, and, more particularly, to mortgages that include a forward mortgage portion and a reverse mortgage portion.

BACKGROUND OF THE INVENTION

A mortgage is a temporary, conditional pledge of property to a creditor as security for performance of an obligation or repayment of a debt. Typically, a homeowner agrees to a mortgage in order to borrow money for purchasing or refinancing their home or dwelling. Many types of mortgages are currently available including mortgages of various lengths, mortgages with different types of interest rates (such as, fixed, variable, or a combination of the two), and mortgages that allow the borrower to pay off only interest on the loan for a period of time. These types of mortgages may also be known in the industry as regular mortgages or "forward mortgages."

Another type of financial arrangement between a lender and a homeowner is called a "reverse mortgage." A reverse mortgage is a loan that allows homeowners, usually older homeowners, to convert their existing equity in their home into available funds. The available funds may be provided, for example, through a line of credit, a cash advance, or periodic disbursements to the homeowner. The funds received by the homeowner are repaid with interest at a predetermined maturity date, or more commonly, when the home is no longer the principal place of residence for the homeowner. Typically, if the homeowner sells the home, moves, or dies, the loan is due to be repaid.

Frequently, the amount of the reverse mortgage is based on a percentage of the homeowner's equity in the home. In general, the more equity the homeowner has in the home, the larger the reverse mortgage loan amount is made available to the homeowner. If necessary, the reverse mortgage funds are repaid from the proceeds of selling the house. One factor in the amount available for a reverse mortgage is the home's value. Currently, under U.S. federal regulations, a reverse mortgage is a non-recourse loan, and thus, the repayment amount cannot exceed the home's value at the time of repayment. Yet another factor that affects reverse mortgages is the age of homeowner. In general, many lenders allow repayment of the reverse mortgage to be deferred until the homeowner dies or no longer lives in the home. Accordingly, if the borrower is older, a lender is typically willing to provide a higher percentage of the homeowner's equity as a reverse mortgage. Other factors may also be utilized in determining a reverse mortgage.

However, despite some of their benefits, forward mortgages are by far the dominant form of mortgages used today.

BRIEF DESCRIPTION OF THE DRAWINGS

A general architecture that implements various features of specific embodiments of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure in which the element first appear.

DETAILED DESCRIPTION

The present disclosure relates to a new type of mortgage that comprises a forward mortgage portion and a reverse mortgage portion. For purposes of this disclosure, this type of combination mortgage is called a "lifetime mortgage." In order to assist with the complexities of mortgage processing, a computer-implemented approach is utilized to combine a forward mortgage and a reverse mortgage. For example, the lifetime mortgage may include an option to a forward mortgage which stipulates that the forward mortgage may be converted into a reverse mortgage at some time in the future. Computerized systems and methods may be used to calculate and present various conversion options available to borrowers. The conversion options may be customized to suit the specific situations faced by many borrowers. A conversion engine can be used determine how and when to convert a forward mortgage to a reverse mortgage.

In some embodiments, the lifetime mortgage is implemented with an automatic conversion option at the time the loan is initiated. If invoked, a borrower may seamlessly convert from the forward mortgage portion to the reverse mortgage portion of the lifetime mortgage. One advantage of such a lifetime mortgage is that little or no new loan documents, or associated fees or costs, are required on the part of the borrower. In the present invention, a mortgage system programmatically projects various forward mortgage and reverse mortgage options available to a borrower. The system takes into consideration, for example, the borrower's age and life expectancy, the home's current value, current interest rates, expected interest rates, and the home's expected future value. A schedule of future reverse mortgage capacities may be provided according to assumptions regarding forward mortgage repayment, future home appreciation and a principal limit factor. The mortgage system may calculate various lifetime mortgage payment/conversion options and display those options in different formats, such as a graphic depiction, a tabular spreadsheet, or the like. The mortgage system may also comprise a rule base or logic to help ensure compliance with various laws and rules that are common to mortgages. For example, as may be prescribed by regulations that govern reverse mortgages, a reverse mortgage portion of the lifetime mortgage may be available only if the dwelling is the primary residence of the borrower(s) at the time of conversion.

The mortgage provider may agree at the beginning of the lifetime mortgage to an automatic conversion option. Under this scenario, if the borrower makes forward mortgage payments according to an agreed schedule, then, at an agreed upon point in the future, the borrower may convert the lifetime mortgage into a reverse mortgage portion. For example, the automatic conversion may be triggered when the available reverse mortgage amount is sufficient to pay all or some of the forward portion of the lifetime mortgage.

The borrower may provide information about different circumstances in which conversion is desired. For example, the borrower may provide a desired age, a desired date at which to convert the lifetime mortgage, or a desired payment schedule on the forward mortgage. These criteria may be input to the mortgage system and the system may present various calculations about a lifetime mortgage or reverse mortgage portion to the borrower. Alternatively, rather than pre-determining a future date for conversion of the lifetime mortgage, the lifetime mortgage system may programmatically project one or more possible schedules for payment and associated conversions of the lifetime mortgage from which the borrower may select in the future. The borrower is thus offered a great deal of flexibility in customizing the lifetime mortgage to his or her own situation and preferences.

In some embodiments, an updated appraisal of the home may be performed at the time of conversion. The appraisal may for example, an online appraisal service, a drive-by appraisal and/or a full appraisal. If the home value is higher than anticipated, the reverse mortgage capacity may be recalculated accordingly. In some embodiments, if the home's value has not appreciated as much as was anticipated at the inception of the lifetime mortgage, the lender honors the reverse mortgage parameters as originally calculated at the inception of the lifetime mortgage.

The programmatic analysis provided by the mortgage system further allows borrowers who wish to re-think and possibly change their long-term goals with regard to the lifetime mortgage, to re-enter input data and consider what their options are and see the consequences of their choices. Thus, borrowers who wish to convert earlier than originally planned may elect to pay higher monthly payments in order to reach an acceptable conversion point at an earlier age. The mortgage system may identify a desired monthly payment amount that will allow them to reach their goal. Alternatively, borrowers who need to temporarily lower their monthly payments may view how the change will affect their available reverse mortgage funds and plan their actions accordingly.

One skilled in the art will recognize that the lifetime mortgage may be applied to any form property or security for a loan. For purposes of the present disclosure, the term "home" may refer to any of a variety of types of dwelling that is, or will be after purchase, a primary place of residence for the one or more borrowers. For example, in various embodiments, the home may be, but is not restricted to: a single-family home, a condominium, a mobile home, a multi-unit dwelling, or another type of residence. In other embodiments, a dwelling or property secured by the lifetime mortgage may be other than the primary place of residence for the borrower(s).

For purposes of this disclosure, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

Figure 1:
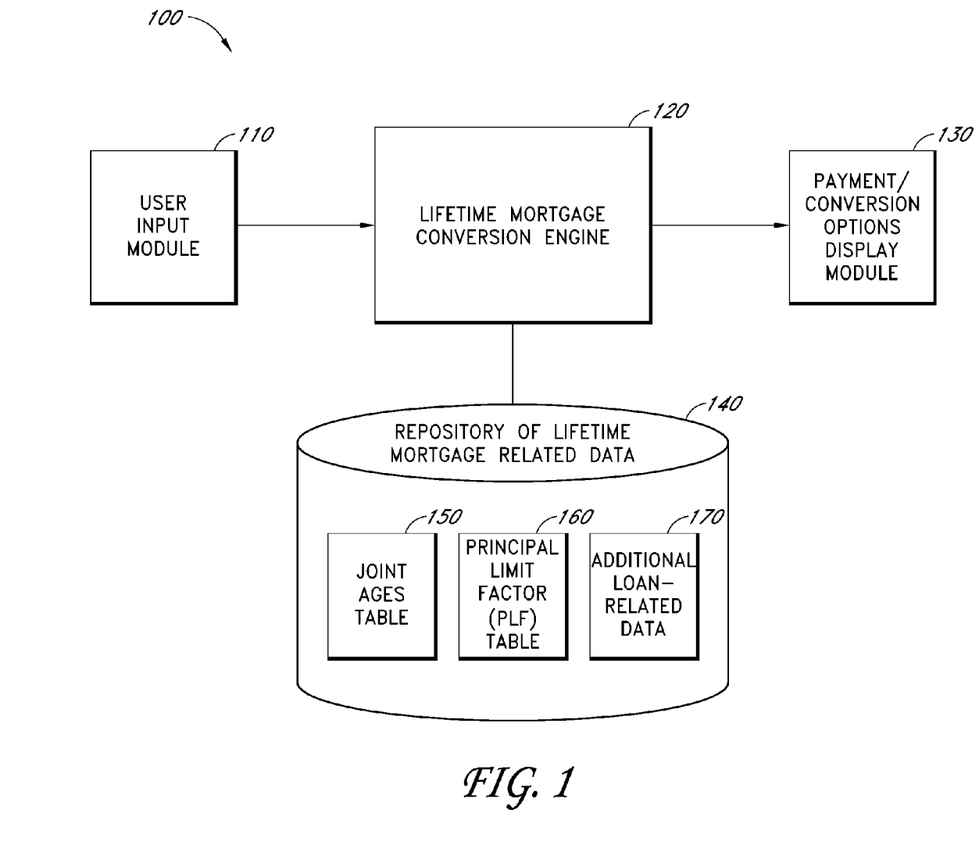
FIG. 1 depicts an overview of one embodiment of a computerized system for calculating a lifetime mortgage.

FIG. 1 depicts an overview of one embodiment of the computerized lifetime mortgage system 100 for calculating various payment schedules and options associated with a forward mortgage portion and a reverse mortgage portion of a lifetime mortgage. As shown, system 100 may comprise a user input module 110, a conversion engine 120, a display module 130, and a mortgage repository 140.

System 100 may be implemented using components of hardware and software that are known to those skilled in the art. For example, system 100 may be implemented on a general purpose computer running a typical operating system, such as Windows, Linux, MacOS, and the like, and software for various aspects of the present invention. Alternatively, system 100 may be implemented on a network, such as a local area network, wide area network, or the Internet. For example, system 100 may be deployed as an online system with a website front end and supporting servers that implement the logic of the present invention and retrieve the data used in the present invention. Some embodiments of the lifetime mortgage system 100 include a secure website that may contain a lifetime mortgage calculator for use by existing borrowers to view various scenarios. Their forward mortgage loan balance and current age may then be used to populate a schedule, which could be viewed and printed with various home appreciation assumptions and forward mortgage payment levels.

For ease of description, the systems and methods disclosed herein may be described interchangeably as relating to a lifetime mortgage for a single borrower or multiple borrowers. Nonetheless, the systems and methods of the present invention may apply both to lifetime mortgages for one borrower and to lifetime mortgages for more than one borrower. The various components of system 100 will now be further described.

Input module 110 provides a user interface that allows, for example, a borrower to request information about the lifetime mortgage for a given home, either real or hypothetical.

In some embodiments, the user input module 110 may be part of an application or a website available on a computer of a bank, lender, mortgage provider, mortgage broker or other financial professional who provides information about the lifetime mortgage to borrowers. The user input module 110 may, in some embodiments, be available online, such as via the World Wide Web or other Internet format, to financial professionals on behalf of the borrowers. Examples of data received from the borrower may include, but is not limited to: a current value of the home associated with the lifetime mortgage; an amount of a forward mortgage requested by the borrower; a current age or birth date for each borrower; and a desired date of future conversion of the lifetime mortgage to a reverse mortgage portion. In some embodiments, the borrower may not specify a desired date of future conversion of the lifetime mortgage to a reverse mortgage portion. Examples of data specific to the lifetime mortgage entered by the professional may include some, all, or none of: a current interest rate for the forward mortgage portion of the lifetime mortgage, an expected rate of appreciation of the value of the home, and expected future ten-year Treasury rate, London Interbank Offered Rate (LIBOR), and an updated estimate of the home's value. The home value may be updated by any of a variety of means, including, for example, electronic appraisal service, drive-by appraisal, and/or full appraisal.

The conversion engine 120 receives the data from the user input module 110 and calculates one or more options for lifetime mortgage payment/conversion schedules. The conversion engine 120 may perform its calculations according to a formula that is based on: age of the borrower (or, if owned jointly by two or more persons, of the borrowers) at the time of conversion, value of the home at the time of conversion, the borrower's expected future equity in the home at the time of conversion, and the balance on the forward mortgage portion at the time of conversion, along with other factors described in greater detail below. The lifetime mortgage conversion engine 120 may then calculate various forward mortgage payment options and reverse mortgage options. For example, the conversion engine 120 may calculate amounts of funds that will be available to the borrower in the form of the reverse portion of the mortgage at various times in the future, for example, based on the forward mortgage payments. In order to perform its calculations, the conversion engine 120 may employ various computerized spreadsheets, other financial systems, and known calculations, to project the effects of various scenarios, such as an assumed appreciation.

In addition to the data received from the user input module 110, the conversion engine 120 may also access data from the repository mortgage data 140 in order to generate one or more payment schedules depicting possible forward and reverse portions of the lifetime mortgage. For example, conversion engine 120 may employ various queries, web services, and other interfaces in order to obtain data from the repository of mortgage data 140.

Once the lifetime mortgage conversion engine 120 has calculated at least one proposed payment schedule and/or conversion schedule, or other data associated with lifetime mortgage, the results may be sent to the payment/conversion display module 130 for display in one or more of a variety of formats. Examples of some display formats are described in greater detail with reference to FIGS. 4-6 to follow.

The display module 130 formats and provides information about the lifetime mortgage. In some embodiments, the display of display module 130 may be interactive. For example, a financial professional, borrower, or other user may alter values in the display, thereby instructing the lifetime mortgage conversion engine 120 to re-calculate the data and the display module 130 to display the re-calculated data. In some embodiments, the display module 130 and the user input module 110 may both be included in an interactive user interface of the lifetime mortgage system 100.

A borrower interested in receiving information about the lifetime mortgage may use the display module 130 of the lifetime mortgage system 100 to identify desired terms for taking out a lifetime mortgage. The display module 130 may provide reports to lifetime mortgage borrowers at a quarterly or other advantageous interval. The reports may provide detailed and, preferably, personalized information about options currently available to the borrower. The report may include information, for a given borrower, stating that, "if you elect to increase your monthly mortgage payment by $X, and if your home appreciates at 3.0% per year, then at age 62 you should be eligible for a reverse payment amount of $Y." Other types of detailed and personalized information may be provided by the payment/conversion display module 130 upon request, either as part of the report, as a visual on-screen re-calculation of the lifetime mortgage parameters, or in another format.

The repository of mortgage data 140 provides a storage infrastructure for the mortgage data utilized by the present invention. The repository of lifetime mortgage related data 140 may also store information about existing lifetime mortgages, including payment history data that can be used to re-calculate lifetime mortgage options. The repository 140 may be implemented as computer storage that stores data in data files in a database format. As depicted in FIG. 1, the repository 140 may include a joint ages table 150, a principal limit factor table 160, and additional data 170. In some embodiments, one or more of the joint ages table 150, the principal limit factor table 160, and/or the additional loan-related data 170 may be updated to include newly available financial data, actuarial data regarding life expectancies, or other relevant data. Such updates are preferably made infrequently enough to prevent instability in the lifetime mortgage system 100. The joint ages table 150 is described in greater detail with reference to FIG. 2. The principal limit factor table 160 is described in greater detail with reference to FIG. 3.

As to the additional data 170, this table may store data that is used to calculate the forward mortgage portion and/or the reverse mortgage portion of the lifetime mortgage. For example, the additional data 170 may include data about current mortgage interest rates, projected real estate valuation data and/or inflation rate projections. The additional data 170 may include data about one or more financial indicators that affect mortgage rates, such as the ten-year Treasury rate or a LIBOR swap rate. The additional data 170 may also include information about a government sponsored enterprise (GSE) limit look-up table that provides maximum allowable limits on home loans according to the home location. GSE limits apply to reverse mortgages sponsored by HUD, Fannie Mae, Freddie Mac, and other GSE's. Proprietary reverse mortgages are typically not subject to the GSE lending limits. The lifetime mortgage may include a GSE and/or a proprietary reverse mortgage component. Other types of additional loan-related data 170 may be stored in the data repository 140.

Although one embodiment of a lifetime mortgage system 100 has been described with reference to FIG. 1, other embodiments will be apparent to those of ordinary skill in the art from the disclosure herein. For example, FIG. 1 depicts the user input module 110, the lifetime mortgage conversion engine 120, the payment/conversion display module 130, and the repository of lifetime mortgage related data 140 of the lifetime mortgage system 100 as separate components, which may be configured to operate within one computer system in one location, or may be implemented as a distributed system of hardware, software, and related components that function together across a variety of physical and/or geographical locations. In other embodiments, the functions of two or more of the modules 110, 120, 130, 140 may be combined and/or the functions of one or more of the modules 110, 120, 130, 140 may be divided differently than is depicted in the sample embodiment of FIG. 1. For example, in some embodiments payment history data for lifetime mortgage borrowers may be stored in the data repository 140. The payment history data may be used by the conversion engine 120 to update projections about the forward and reverse portions of the lifetime mortgage. For example, although the joint ages table 150, the principal limit factor table 160, and the additional loan-related data 170 are depicted and described with reference to FIG. 1 as being separate repositories or files within the repository of lifetime mortgage related data 140, in other embodiments, some or all of the data in the repositories 150, 160, 170 may be configured as one large repository or may be subdivided differently than depicted in FIG. 1.

Figure 2:
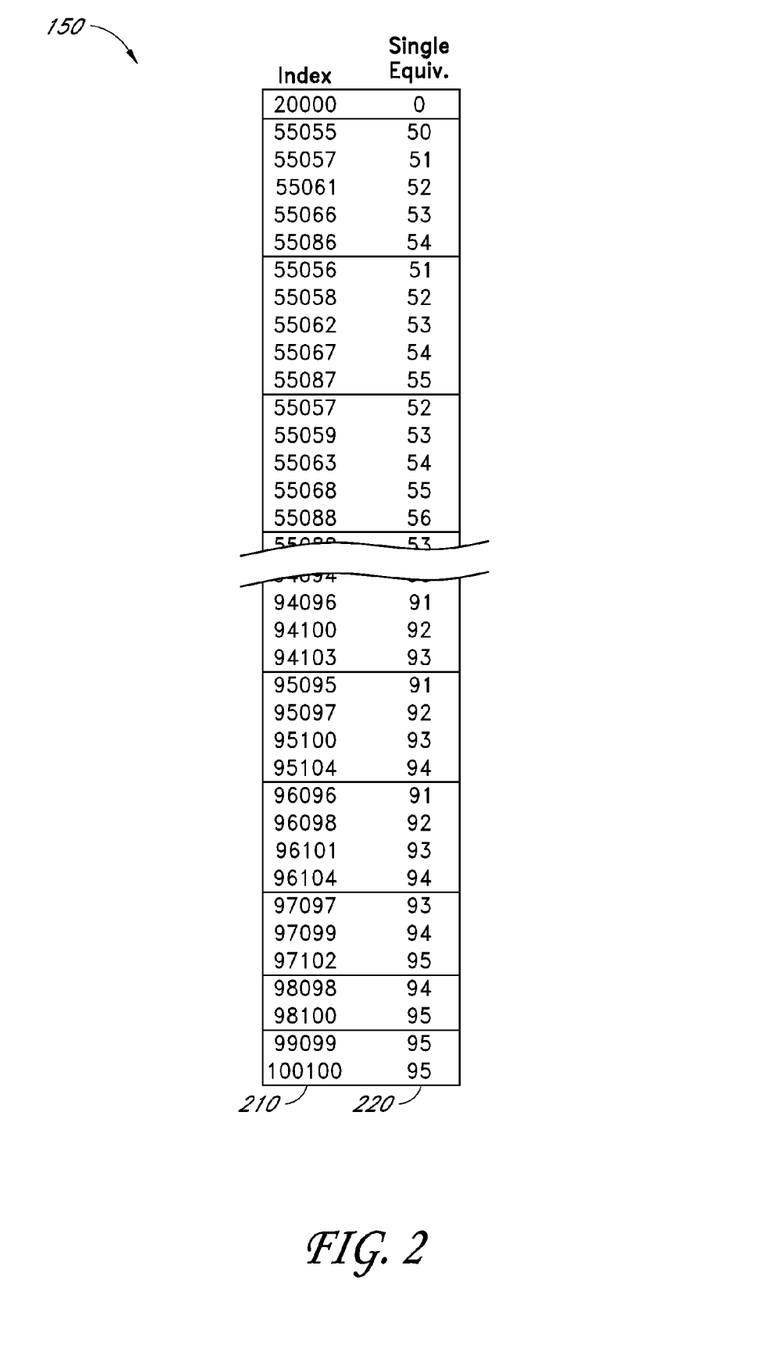
FIG. 2 depicts a sample of one embodiment of a joint-ages table that may be used by the computerized system of FIG. 1.

FIG. 2 depicts a sample of one embodiment of a joint-ages table 150 that may be used by the computerized system 100. Joint-ages table 150 assists in accounting for the effect of multiple borrowers of a mortgage. In general, the age of the borrowers is considered because repayment of the reverse mortgage may be deferred until the borrower dies or no longer lives in the home. This feature affects the amount made available by the lender for the reverse portion of the lifetime mortgage. Where multiple borrowers are involved, according to actuarial statistics, two people of a given age will have a combined life expectancy that is equivalent to the life expectancy of a younger person. For example, two people, both aged fifty-five, will have a combined life expectancy equivalent to a person aged fifty. In other words, at least one of the two fifty-five-year-old borrowers is expected to live as long as a single fifty-year-old.

In some embodiments, the ages of two or more borrowers applying jointly are replaced by a single actuarially equivalent or other selected age for purposes of calculating the reverse mortgage portion of the lifetime mortgage. The joint ages table 150 in FIG. 2 depicts one embodiment of a conversion table for determining an equivalent age for joint borrowers. In the table 150 of FIG. 2, a first column 210 includes a listing of a five-or-six digit index number that represents the two ages. When both ages are two-digit numbers, the two leftmost digits of the index number represent the age of a younger borrower and two rightmost digits of the index number represent the age of an older borrower. An associated entry in a second column 220 lists an age that is actuarially equivalent to the pair of ages and that can be considered to be the age of a fictitious "joint" borrower equivalent to the two actual borrowers. For example, in the figures illustrated in FIG. 2, a first borrower aged fifty-five and a second borrower aged fifty-six are equivalent to a single "joint" borrower of age fifty-one. The mortgage system 100 will thus treat these two borrowers as a single borrower that is age fifty-one. Of course, the conversion engine 120 may simply use the age of the youngest borrower or may use another method for calculating the schedules of the lifetime mortgage. Rather than an equivalent age, other embodiments may calculate a single "joint" life expectancy for multiple borrowers. When a lifetime mortgage is requested for more than two borrowers, additional calculations and/or look-ups may be performed, as will be familiar to one of ordinary skill in the art in light of this disclosure. Other embodiments of the joint ages table 150 may include conversion figures for more than two borrowers.

Figure 3:
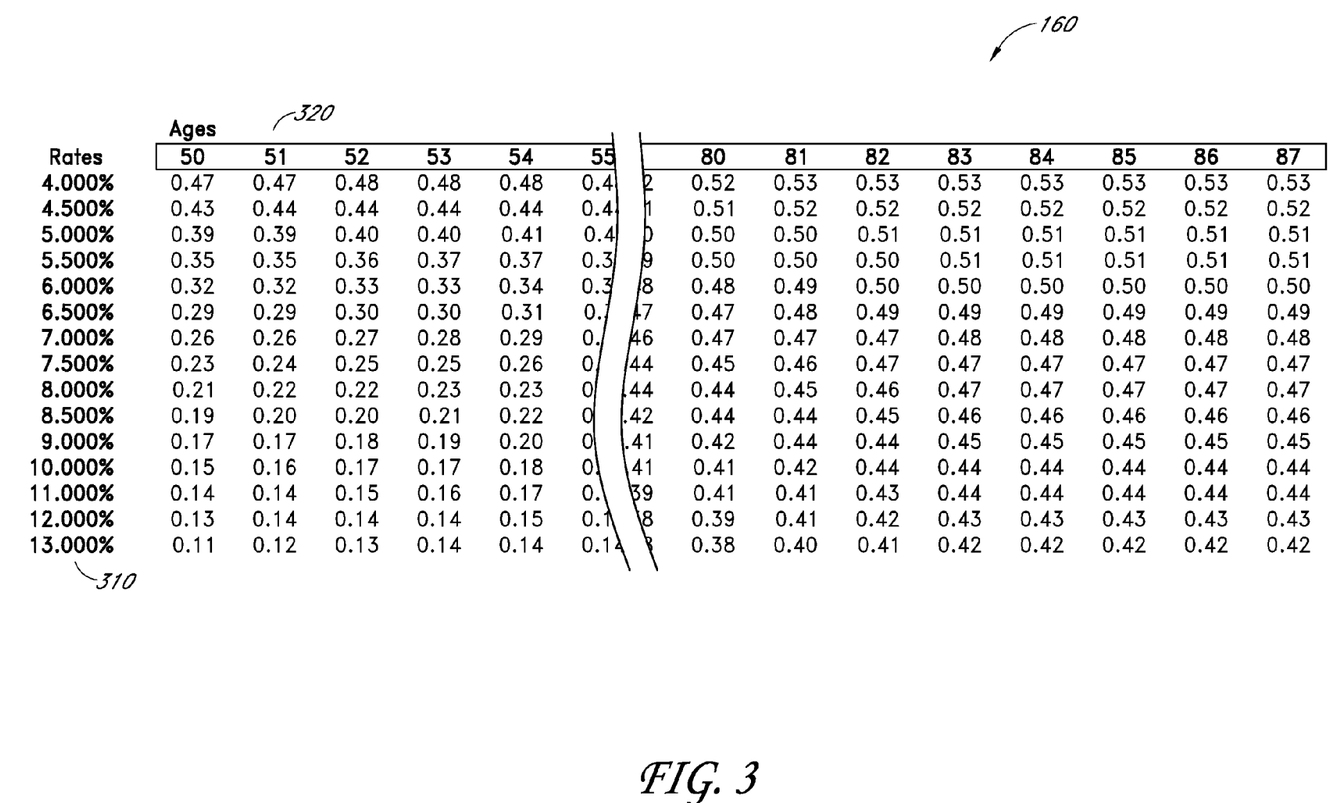
FIG. 3 depicts a sample of one embodiment of a principal limit factor (PLF) table that may be used by the computerized system of FIG. 1.

FIG. 3 depicts a sample of one embodiment of a principal limit factor (PLF) table 160 that may be used by the computerized system of FIG. 1. The principal limit factor table 160 converts the age 320 of the borrower or the "joint" borrower and an interest rate 310 associated with the forward mortgage portion of the lifetime mortgage into a principal limit factor. The principal limit factor indicates a percentage of the borrower's equity in the home or the home's value that is available as a reverse mortgage portion of the lifetime mortgage. Thus, according to the sample PLF table 160 in FIG. 3, a fifty-year-old borrower or "joint" borrower having a forward mortgage interest rate of 4.000% may be eligible for a reverse mortgage equivalent to 47% of the equity in the home, while the same borrower having a forward mortgage interest rate of 5.000% may be eligible for a reverse mortgage equivalent to only 39% of the equity in the home. Additionally, if the borrower with the 4.000% interest rate waits until age eighty to convert the lifetime mortgage, a reverse mortgage equivalent to 52% of the equity in the home, which will have grown due to the intervening forward mortgage payments, may be eligible for a reverse mortgage.

In one embodiment, lifetime mortgage loan documents may include a schedule that converts the borrower's age into a reverse mortgage principal limit factor (PLF). For example, a borrower of age 65 may have a factor of 22.16%. If the borrower's home is appraised at $389,500, then the reverse mortgage capacity would be $86,309 (22.16% of the appraised value).

Some embodiments may use a PLF factor table 160 that is published by a government agency. For example, the U.S. federal government publishes a PLF table for reverse mortgages associated with Fannie Mae. In other embodiments, a proprietary PLF table 160 may be used. Those skilled in the art will recognize that the principal limit factor can be expressed as a percentage or other form.

Figure 4:
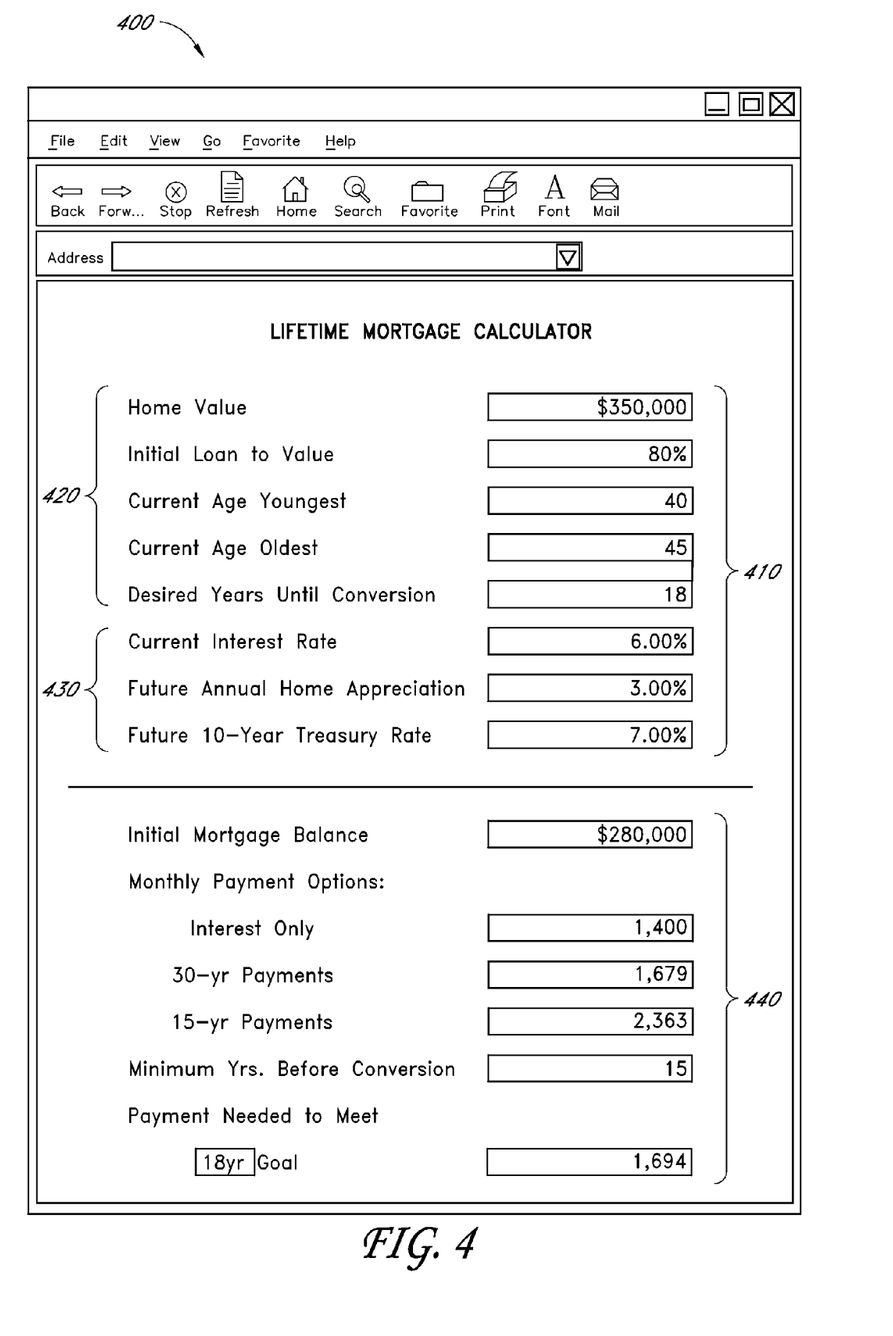
FIG. 4 depicts a sample computer screenshot of one embodiment of a user interface summary page for a lifetime mortgage system.

FIG. 4 depicts a sample computer screenshot of one embodiment of a user interface summary page 400 that may be provided by display module 130. As shown, an upper input portion 410 of the summary page 400 accepts user input, and a lower results portion 440 of the summary page 400 automatically displays lifetime mortgage results based on the input from the input portion 410. In some embodiments, a first set 420 of input values includes data provided by the borrower, while a second set 430 of input values includes data provided by the financial professional. In some embodiments, the second set 430 of input values are not included on the summary page and are input automatically by the system 100. Of course, a wide variety of summary display page 400 formats and contents may be provided by the lifetime mortgage system 100 for use by the borrower and/or by the financial professional on behalf of the borrower.

The sample embodiment depicted in FIG. 4 allows a user to enter a desired number of years until conversion, in this case eighteen years. In the sample embodiment depicted in FIG. 4, an initial borrower equity value in the home is expressed as an initial loan-to-value amount, showing that the initial desired forward mortgage portion is for 80% of the $350,000 value of the home. The resulting initial mortgage balance of $280,000 is displayed in the results portion 440 of the summary page 400.

The results portion 440 includes three monthly payment options available to the borrower. As shown, an interest only payment option provides the lowest monthly payment, while a 15-year forward mortgage provides the highest monthly payments.

The results portion 440 also indicates that the minimum number of years before eligibility for conversion is fifteen years. This result is based on calculations that determine a point in time when a declining amortized balance of the forward mortgage portion equals a growing future benefit of the reverse mortgage portion, as is illustrated graphically with reference to FIG. 5 to follow.

The results portion 440 further indicates the borrower's eighteen year goal for conversion and provides a monthly payment amount that is needed to accomplish conversion within the eighteen-year goal. In the example shown in FIG. 4, the borrower is informed that by making a monthly payment of $1,694, which is higher than the 30-year rate, but lower than the 15-year rate, the conversion date goal may be reached.

Figure 5:
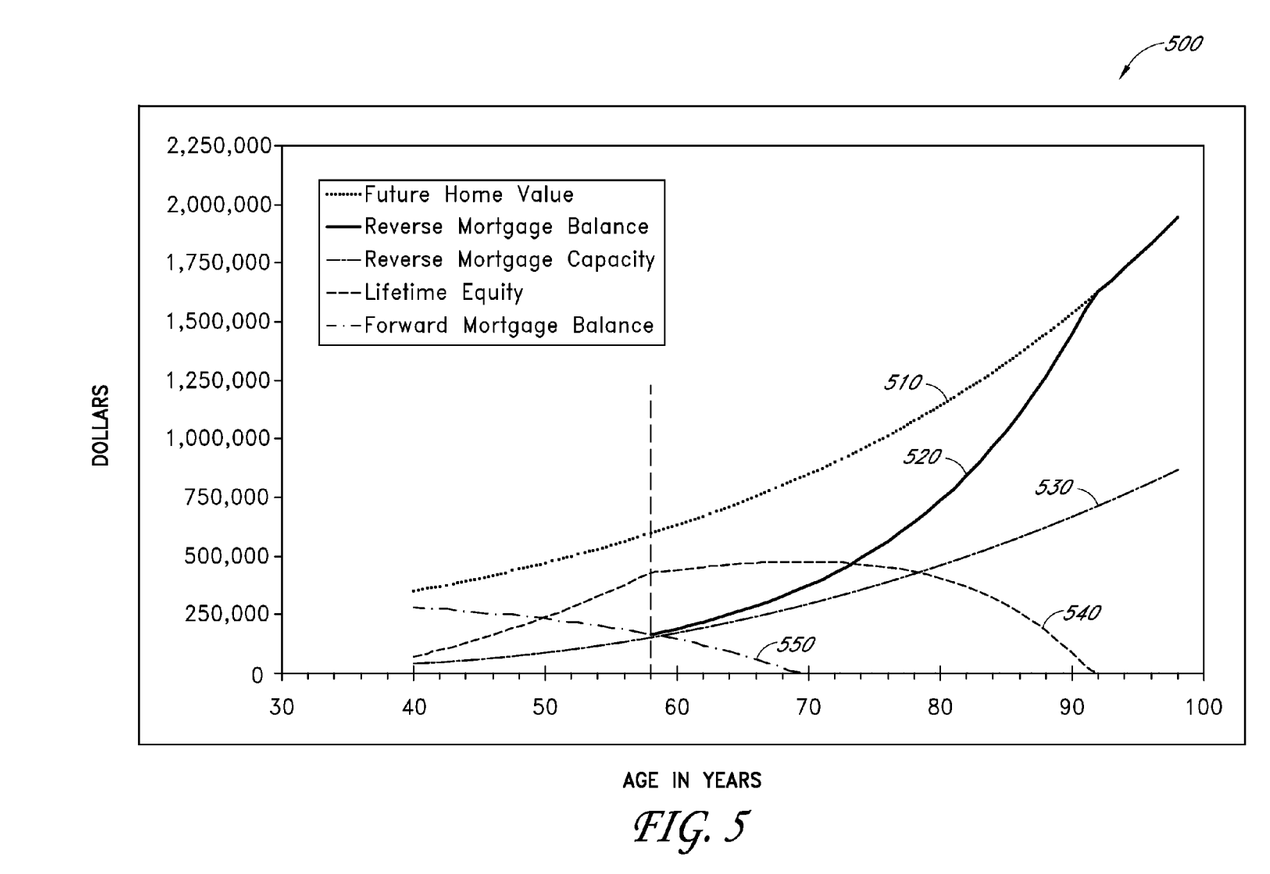
FIG. 5 depicts a sample of one embodiment of a graphical user display generated by the lifetime mortgage system to depict one or more lifetime mortgage options available to a borrower.

FIG. 5 depicts a sample of one embodiment of a graphical user display 500 generated by the mortgage system 100 to depict one or more lifetime mortgage options available to a borrower. As shown, the display 500 may comprise a future home value 510, a reverse mortgage balance 520, a reverse mortgage capacity 530, a lifetime equity amount 540, and a forward mortgage balance 550.

In some embodiments, the graph 500 may be available in the form of an interactive graph that allows a borrower to enter values describing one or more options of interest, such as into an input portion 410 and visually see the results. Borrowers may also use the interactive graph 500 to compare options and to see the effects of changes on the various curves.

As shown, the sample graph 500 of FIG. 5 depicts several values and their changes over the life of the lifetime mortgage. In particular, the sample graph 500 depicts values for the same example described in the summary page 400 of FIG. 4. As before, the younger borrower is age forty when the lifetime mortgage is initiated, the home value is $350,000 and the initial mortgage balance is $280,000. Future home value curve 510 depicts the value of the home as it is expected to appreciate over time. Reverse mortgage capacity curve 530 depicts a capacity, or maximum eligible value, of the reverse mortgage if it is triggered at various points in time. As shown, the reverse mortgage capacity 530 increases in value the longer the borrower waits to convert the lifetime mortgage.

Meanwhile, curve 550 depicts the ongoing forward mortgage balance. At the inception of the lifetime mortgage, the forward mortgage balance 550 is equal to approximately 80% of the home value. In time, as payments are made, the forward mortgage balance 550 approaches zero as the borrower makes payments. In fact, in accordance with the suggest payments needed to meet the borrower's eighteen year goal for conversion from FIG. 4, the forward mortgage balance 550 is projected to equal zero in slightly less than thirty years from inception of the lifetime mortgage.

As indicated in the summary page 400, a crossing point exists at age fifty-eight (eighteen years from inception of the lifetime mortgage) between the forward mortgage balance 550 and the reverse mortgage capacity 530. The crossing point indicates the age at which a conversion to a reverse mortgage will yield funds sufficient to cover the remaining forward mortgage balance 550.

Curve 520 represents the reverse mortgage balance, assuming that no payments are made on the reverse mortgage portion. As depicted, before the reverse portion of the lifetime loan is triggered at age forty-eight, there is no reverse mortgage balance. At the time of conversion, the reverse mortgage balance 520 equals to the remaining forward mortgage balance 530. Then, as no payments are made, the reverse mortgage balance 520 begins to accrue interest and grow. At approximately age ninety-two, the reverse mortgage balance 520 equals the value of the home 510. From that point on, the reverse mortgage balance 520 is capped (for example, by regulation or policy) as a mortgage payoff amount, which continues to equal the value of the home 510.

Curve 540 represents the borrower's equity in the home, which the difference between the home value and the forward mortgage balance 550. As depicted in the graph 500, from age forty to age forty-eight, the borrower's equity 540 in the home continues to grow as payments are made to pay down the forward mortgage balance 550. Once the lifetime mortgage is converted to the reverse mortgage portion, the borrower's equity 540 in the home begins to drop, until at age ninety-two the reverse mortgage balance 520 equals the value of the home 510 and the borrower's equity 540 in the home equals zero.

The curves depicted in FIG. 5 allow the borrower and the lender to visualize the evolution of the lifetime mortgage. For example, while the outstanding balance 550 on the forward mortgage portion is greater than the reverse mortgage capacity 530 at a time of desired conversion, one option available to the borrower is to pay down the forward balance 550 with other funds to the point that it comes in line with the available reverse mortgage funds 530. From then on, mortgage payments can be deferred until the reverse mortgage becomes due, such as when the borrower moves or dies. Another option for the borrower is to delay conversion until he or she is older. Like other reverse mortgage designs, in most embodiments, the older a borrower is at the time of conversion, the more loan capacity he or she qualifies for.

In some embodiments the reverse mortgage capacity 530 represents an anticipated reverse mortgage capacity at various points in the future. However, conversion of the lifetime mortgage at any given point is based on a new actual appraisal valuation of the home at the time of conversion. The actual home value may be higher or lower than anticipated. In some embodiments, a provider of the lifetime mortgage may guarantee a minimum home appreciation rate, such as a 2% appreciation rate, for use in calculating the reverse mortgage capacity at the time of conversion.

In some embodiments, if, at the time of conversion, the home's value has appreciated more than expected, or the borrower has paid enough or waited long enough, so that the available reverse mortgage 530 funds exceed the remaining balance 550 on the forward mortgage, the borrower may be eligible to receive the difference as a cash disbursement. Alternatively, in some embodiments, the borrower may elect not to receive the cash disbursement, and to instead leave the funds in a line-of-credit associated with the lifetime mortgage that the borrower may access in the future. In one embodiment, the line-of-credit capacity may be configured to grow over time.

FIG. 5 presents one exemplary graphical display 500 of lifetime mortgage data that may be provided to the borrower to assist in understanding and planning with reference to the lifetime mortgage system 100. In other embodiments, other useful graphical depictions of lifetime mortgage related data may additionally or alternatively be provided by the display module 130.

Figure 6:
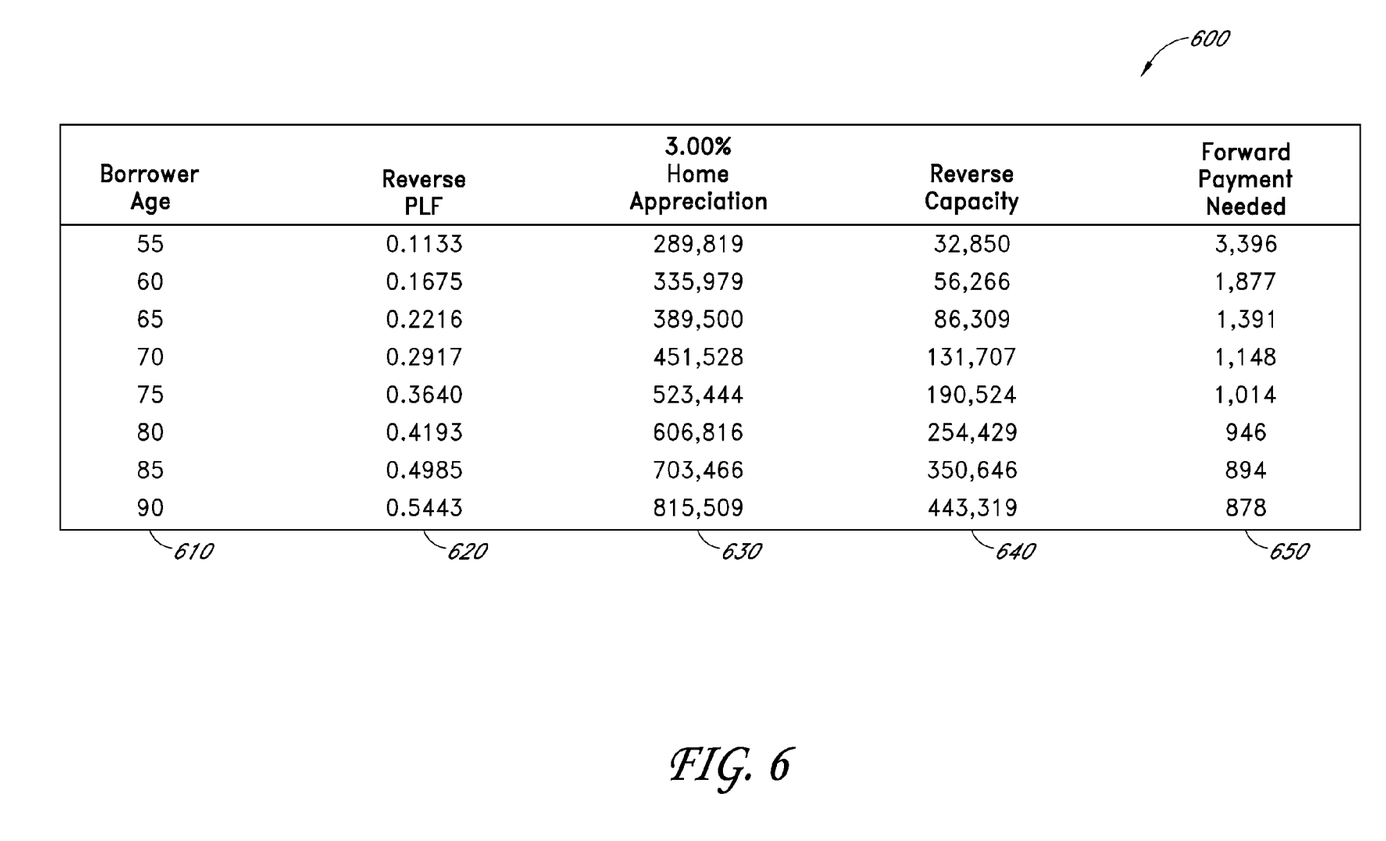
FIG. 6 depicts a sample of one embodiment of a tabular user display generated by the lifetime mortgage system to depict various lifetime mortgage options available to the borrower.

FIG. 6 depicts a sample of one embodiment of a tabular user display 600 generated by the lifetime mortgage system to depict various lifetime mortgage options available to the borrower at different points in the future. The numerical values in the table 600 are based on input indicating a $200,000 forward mortgage at 6.00% and an assumed 3.0% annual future home appreciation.

Column 610 represents the age of the borrower or the "joint" age of the "joint" borrower. Column 620 depicts associated reverse mortgage PLF values for the ages of column 610. The values in Column 620 are based, at least in part, on future projected interest rates on the reverse portion of the lifetime mortgage. Column 630 depicts the value of the home over time, assuming an annual appreciation rate of 3.00%. Column 640 depicts the reverse mortgage capacity of the lifetime mortgage, which increases as the borrower ages and as the home appreciates in value. The values in column 650 depict monthly payment amounts to pay down the forward mortgage to the expected reverse mortgage capacity by the various associated ages.

In this example of a $200,000 forward mortgage at 6.00% interest, the interest-only monthly payment would be $1,000. In some embodiments, the interest-only amount represents a minimum allowable forward mortgage payment, because the lender likely would not allow a long-term plan paying less than this amount as it would cause negative amortization on the original loan. For such embodiments, the figures for ages 80, 85, and 90 in table 600 of FIG. 6 are thus hypothetical values, because they fall below the interest-only level and would thus not likely be accepted.

In some embodiments of the lifetime mortgage, the borrower may be offered an option to select from a range of monthly payment amounts to make on the forward mortgage portion in order to reach a desired long-term goal. An intelligent design of this "lifetime mortgage" may structure the amortization of the forward mortgage such that the borrower's reverse mortgage capacity is greater than or equal to the forward mortgage's balance at or beyond a certain point in the future, such as from age sixty-two and onwards. For example, if a new borrower is fifty years old and their home is valued at $250,000, a loan-to-value ratio of 80% may allow them to borrow $200,000. The borrower may believe that age sixty-five, which is fifteen years in the future, would be a good age at which to convert his loan to a reverse mortgage and to defer payments on the remaining balance. A fifteen-year amortization schedule with 6.00% interest would suggest monthly payments on the forward mortgage to be set at $1,688. But the forward mortgage need not be paid down to zero. The forward mortgage may be paid down to the capacity of the reverse mortgage option. If, in fifteen years, the home is valued at $389,500, the reverse mortgage capacity (based at least in part on the PLF) may be calculated at $86,309. The forward mortgage could be paid down to that level in fifteen years if the borrower makes monthly forward mortgage payments of $1,391.

Figure 7:
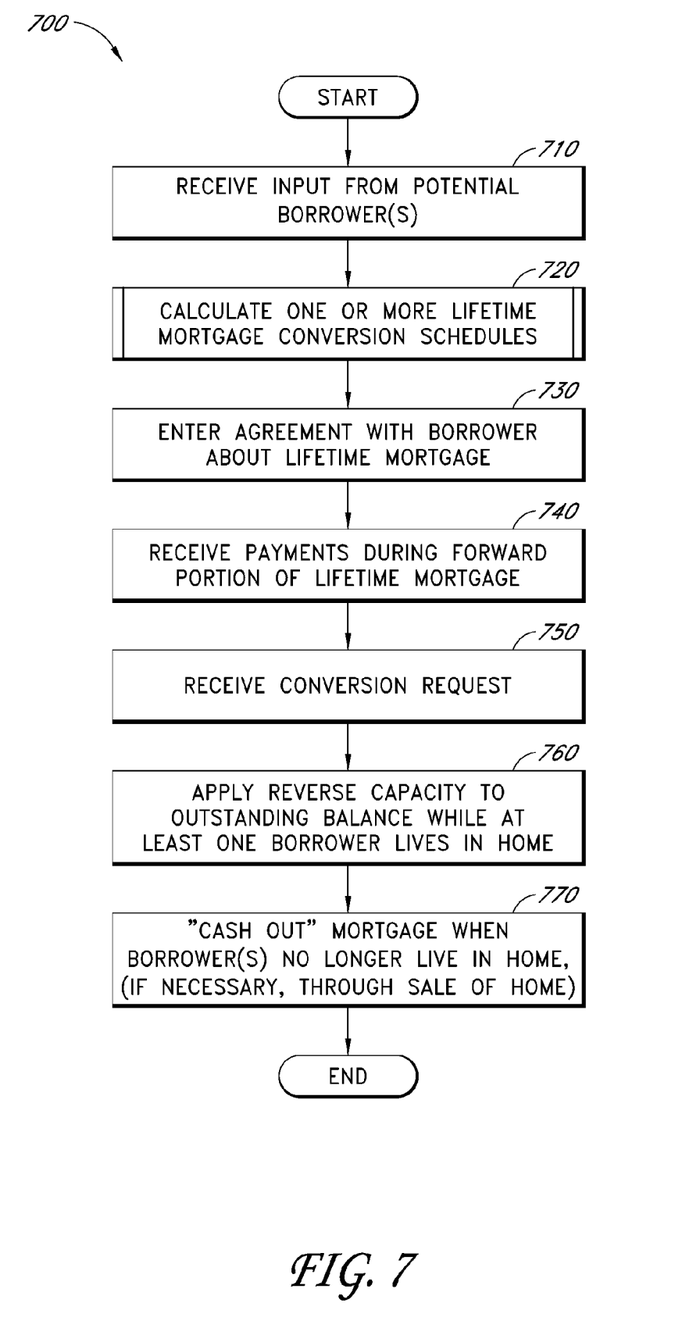
FIG. 7 is a flowchart that describes one embodiment of a computerized process for implementing a lifetime mortgage.

FIG. 7 is a flowchart that describes one embodiment of a computerized process 700 carried out by the lifetime mortgage system 100 for implementing a lifetime mortgage.

Beginning in block 710, the user input module 110 receives input regarding one or more potential borrowers. For example, the user input module 110 may receive data input from a user interface summary page 400 as depicted in FIG. 4. As has been described above, the input may include, but is not limited to, information about a given home or about a price range of interest, information about the age(s) of the borrower(s), information about a desired forward mortgage amount. In some embodiments, potential borrowers may also specify a desired date/age of conversion of the lifetime mortgage to a reverse mortgage portion.

Moving on to block 720, the conversion engine 120 calculates one or more lifetime mortgage conversion schedules that depict payment options and potential reverse mortgage conversion options for one or more potential conversion dates. A more detailed description of the functions of block 720 is provided in FIG. 8 to follow.

Moving on to block 730, an agreement is entered into with the borrower regarding an inception and associated terms and options of the lifetime mortgage.

Moving on to block 740, the mortgage system 100 determines that payments have been received during a forward mortgage portion of the lifetime mortgage. For example, conversion engine 120 may query information from the repository 140 at various intervals. In some embodiments, the forward mortgage portion of the lifetime mortgage may be structured as an "option mortgage," thus allowing the borrower to make changes in the monthly payment amount paid each month. For example, an interest-only amount may be paid, a 30-year mortgage rate may be paid, a 15-year mortgage rate may be paid, or another type of payment may be allowed. The lifetime mortgage may be structured with fixed or variable interest rates for the forward and/or reverse mortgage portions. Adjustable rate features may cause projections to vary over time as the forward balance grown.

Moving on the block 750, the mortgage system 100 receives a request to convert from the forward mortgage portion to the reverse mortgage portion of the lifetime mortgage. In some embodiments, the request may be pre-scheduled at the inception of the lifetime mortgage and may be initiated by an automated system. In some embodiments, the borrower may notify the system 100 that a conversion is desired.

Moving on to block 760, the conversion engine 120 calculates the current reverse mortgage capacity at the time of conversion and applies the reverse mortgage capacity amount towards an outstanding balance of the forward mortgage portion. In some preferred embodiments, after the borrower exercises the reverse mortgage option, the lifetime mortgage requires no monthly payments, becomes non-recourse, and is not due until the home is no longer the borrower's principal residence. Thus, in some embodiments, the homeowner may not receive cash in hand, but, because the funds are applied to the forward mortgage balance, the borrower, or an agent acting on behalf of the borrower, does not need to continue making payments until the borrower ceases living in the home, due to a move or to death, at which time, in various embodiments, an entire amount of the reverse mortgage portion becomes due and payable.

Moving on to block 770, when the borrower, or all borrowers associated with the lifetime mortgage, no longer live in the home, the reverse mortgage portion of the lifetime mortgage is paid off. If necessary, the reverse mortgage portion is paid off through the sale of the home. As described above, the amount due on the reverse mortgage may not exceed a current value of the home. If additional funds remain from the sale of the home after repayment of the reverse mortgage, the additional funds are payable to the borrower or to an agent of the borrower. Alternatively, the borrower or borrower's agent may choose to pay off the reverse mortgage using other funds, and the borrower, or the borrower's estate, may retain ownership of the home. In either case, once the reverse mortgage portion has been repaid, the process 700 ends.

Figure 8:
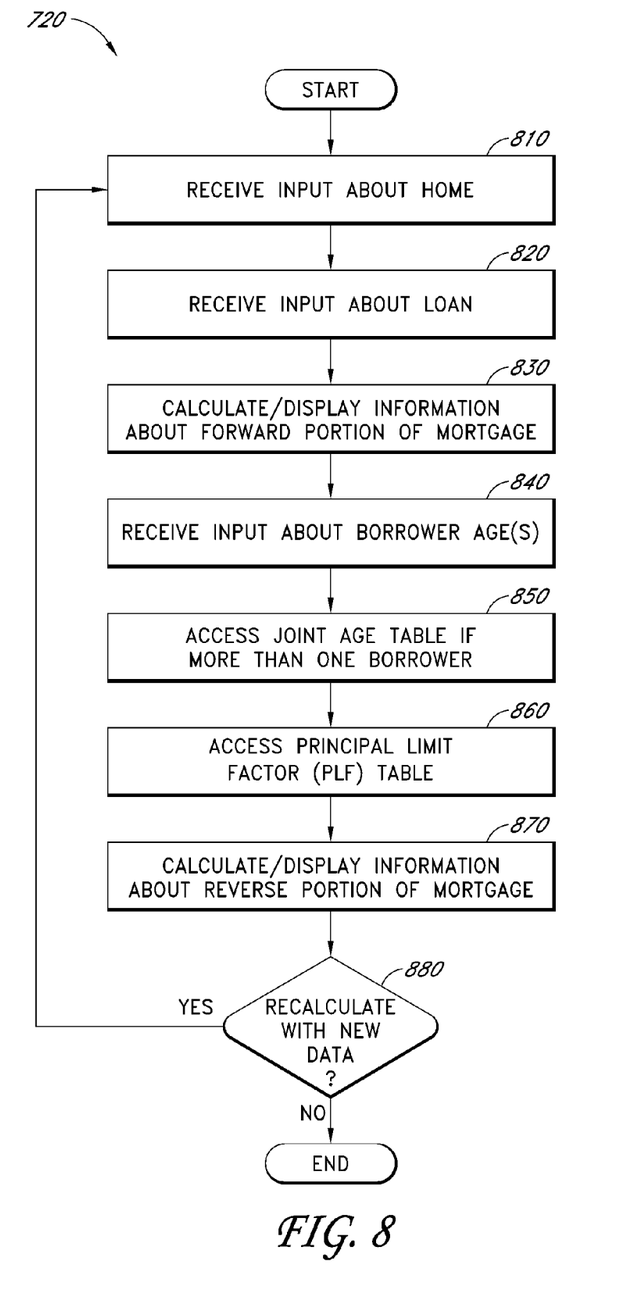
FIG. 8 is a flowchart that describes one embodiment of a computerized process for calculating one or more lifetime mortgage conversion schedules.

FIG. 8 is a flowchart that describes one embodiment of a computerized process 800 for calculating one or more lifetime mortgage conversion schedules. In general, calculation of the conversion schedules is performed by the lifetime mortgage conversion engine 120, based in part on data received from the user input module 110 and from one or more repositories of lifetime mortgage data 140.

The process 800 begins in block 810, in which the user input module 110 receives input about the home for which a lifetime mortgage is requested from a borrower or a professional accessing the system 100 on behalf of the borrower. For example, the user input module 110 may receive input regarding a purchase price and/or current appraised value of the home. If necessary, information about the location of the home may be provided and used by the system 100 to calculate the lifetime mortgage. In some embodiments, the user input module 110 receives confirmation that the home is or will, upon purchase, be the primary residence of the borrower (s).

The lifetime mortgage conversion engine 120, in turn, receives the input about the home from the user input module 110. In addition, the conversion engine 120 may access the repository 140 to receive additional information about the home. In embodiments that use the GSE limit, for example, the conversion engine 120 may receive home location information from the user input module 110 and may access GSE limit information for the home location from the repository.

In block 820, the user input module 110 receives input about the desired forward mortgage from the borrower or financial professional. For example, the user input module 110 may receive information about a mortgage dollar amount and/or about a forward mortgage interest rate.

The conversion engine 120, in turn, receives the input about the forward mortgage loan from the user input module 110. For example, in some embodiments, the conversion engine 120 receives information about a loan-to-value ratio, which the conversion engine 120 can use to calculate the mortgage dollar amount. In addition to the data received from the user input module 110, the conversion engine 120 may access the repository 140 to receive additional information about the forward mortgage. For example, the conversion engine 120 may receive from the repository 140, information about mortgage interest rates and other types of mortgage-related data.

In block 830, the conversion engine 120 uses the information about the home and about the loan, as well as other stored information, to calculate one or more payment schedules for the forward mortgage portion of the lifetime mortgage system 100 calculates. The conversion engine 120 transmits information about the one or more payment schedules to the payment/conversion display module 130 for display to the borrower, to a financial professional, or to another user.

In block 840, the user input module 110 receives input about the ages and/or statistical life expectancies associated with a borrower or borrowers listed on the lifetime mortgage. The conversion engine 120, in turn, receives the input about the borrower(s) from the user input module 110. In addition, the conversion engine 120 may access the repository 140 to receive additional information about the borrowers.

In block 850, the conversion engine 120 accesses the joint age table 150 if more than one borrower is requesting the lifetime mortgage.

In block 860, the system 100 accesses the principal limit factor (PLF) table.

In block 870, the conversion engine 120 calculates information about the reverse mortgage portion of the lifetime mortgage that is based in part on the information about the forward portion of the lifetime mortgage that was calculated with reference to block 830. The conversion engine 120 also uses the input about the borrower(s) from block 840, the principal limit factor from block 860, and if necessary, the joint age determination from block 850. The conversion engine 120 transmits information about the reverse mortgage portion to the payment/conversion display module 130 for display to the borrower, to a financial professional, or to another user.

In block 880, the display module 130 displays an offer to the borrower, or other user of the system 100 to recalculate the lifetime mortgage payment schedules and conversion options using different parameters, such as, but not limited to, different home information, different borrower age information, different desired conversion date, different loan to home value ratio, different forward mortgage interest rate, different projected home appreciation rates, and the like, if desired.

If a recalculation is desired, the process 800 returns to block 810 and the process 800 is repeated. If no recalculation is desired, the process 800 ends.

As will be appreciated by one of ordinary skill in the art, one embodiment of the above process 800 has been described; a wide variety of other variations and embodiments are also contemplated. In other embodiments, the functions in the various blocks may be performed in a different order. For example, all of the data may be received by the conversion engine 120, as described in blocks 810, 820, 840, 850, and 860, before information about the forward portion and the reverse portion of the lifetime mortgage are calculated and displayed, as described with reference to blocks 830 and 870. Or, the calculations of blocks 830 and 870 may be performed first, and the display functions of blocks 830 and 870 may be performed later. These and other variations are contemplated as falling within the scope of the process 800.

Although the foregoing systems and methods have been described in terms of certain preferred embodiments, other embodiments will be apparent to those of ordinary skill in the art from the disclosure herein. For example, in some embodiments, after initiating a reverse mortgage portion of the lifetime mortgage, but while still living in the home, the borrower may wish to pay off the reverse mortgage amount at a rate similar or equal to the original forward mortgage portion, or at another rate set by the lender. The borrower may resume making monthly payments on the lifetime mortgage and, if desired, may again switch back into a reverse mortgage portion at a future date.

As another example, in some alternative embodiments of the lifetime mortgage, the borrower may be offered an option of ceasing to make payments for a fixed period of time, even for ten to fifteen years, after which time the borrower resumes making payments on the forward mortgage, possibly at a higher forward balance. Thus, this embodiment does not include a reverse mortgage portion. However, in some embodiments, the mortgage may be non-recourse, so that if the loan balance is greater than the home value, the borrower need not make up the shortfall.

Additionally, other combinations, omissions, substitutions and modifications will be apparent to the skilled artisan in view of the disclosure herein. While certain embodiments of the inventions have been described, these embodiments have been presented by way of example only, and are not intended to limit the scope of the inventions. Indeed, the novel methods and systems described herein may be embodied in a variety of other forms without departing from the spirit thereof. Accordingly, other combinations, omissions, substitutions and modifications will be apparent to the skilled artisan in view of the disclosure herein. The accompanying claims, as now presented and as may be amended or otherwise supplemented in the future, and their equivalents are intended to cover such forms or modifications as would fall within the scope and spirit of the invention.

What is claimed is:

1. A computer-implemented lifetime mortgage conversion engine, comprising:
   a computer-readable medium on which are recorded executable instructions that are capable of being executed by one or more computer processors, the executable instructions causing the one or more computer processors to:
   (a) receive, by way of a user input module, data associated with a home for which information about a lifetime mortgage is requested;
   (b) receive, by way of the user input module, data associated with a forward mortgage portion of the lifetime mortgage associated with the home;
   (c) calculate and display information about one or more possible forward mortgage portions for the lifetime mortgage;
   (d) receive, by way of the user input module, data about the age of at least one borrower associated with the home;
   (e) determine if there is more than one borrower associated with the lifetime mortgage and, if more than one borrower is associated with the lifetime mortgage, access a joint ages table to determine a joint life expectancy for the more than one borrower;
   (f) access information about a principal limit factor available for the home, wherein the principal limit factor is based, at least in part on a life expectancy of the borrower, if there is only one borrower for the lifetime mortgage, and on the joint life expectancy from the joint ages table, if there is more than one borrower;

(g) calculate and display, to at least one user of the computer-implemented lifetime mortgage conversion engine, information about a one or more possible reverse portions of the lifetime mortgage, based at least in part on the information about the principal limit factor and on the one or more possible forward mortgage portions for the lifetime mortgage; and (h) determine if the at least one user desires to recalculate the information about the forward mortgage portion and the reverse portion of the lifetime mortgage, and, if the at least one user desires to recalculate the information about the forward mortgage and reverse portions of the lifetime mortgage, then repeat actions (a)-(g).

2. The computer-implemented lifetime mortgage conversion engine of claim 1, wherein the executable instructions further cause the one or more computer processors to calculate and display information about more than one type of forward mortgage portion of the lifetime mortgage.

3. A computer-implemented lifetime mortgage conversion engine, comprising:

a computer-readable medium on which are recorded executable instructions that are capable of being executed by one or more computer processors, the executable instructions causing the one or more computer processors to:

receive, by way of a user input module, data related to a home, including data about a valuation of the home and data about an unpaid balance owed for purchase of the home;

receive, by way of a user input module, data about at least one owner of the home, including data about the age of the at least one owner;

calculate a plurality of forward mortgage payment schedules for repaying the unpaid balance owed for purchased of the home;

calculate a plurality of reverse mortgage portion plans predicted to be available to the at least one owner, wherein the calculation is based, at least in part, on the data about the home, the data about the owner of the home, and the plurality of forward mortgage payment schedules for repaying the unpaid balance owed for purchased of the home, and wherein the calculation includes calculation of at least one future conversion date at which time at least one of the plurality of forward mortgage payment schedules ends and at least one of the plurality of reverse mortgage portion plans begins; and display, to at least one user of the computer-implemented lifetime mortgage conversion engine, information about one or more available lifetime mortgages available to the at least one borrower, wherein each available lifetime mortgage comprises one of the payment schedules, one of the future conversion dates, and one of the reverse mortgage portion plans.

4. The computer-implemented lifetime mortgage conversion engine of claim 3, further configured to:

receive, by way of the user input module, information about a second owner of the home, including data about the age of the second owner;

access information about a combined life expectancy of the owners, based at least in part on the age of the at least one owner and the age of the second owner;

use the combined life expectancy to calculate the plurality of reverse mortgage portion plans for the display to the at least one user of the computer-implemented lifetime mortgage conversion engine.

\* \* \* \* \*

UNITED STATES PATENT AND TRADEMARK OFFICE
CERTIFICATE OF CORRECTION

PATENT NO. : 8,321,336 B2
APPLICATION NO. : 13/168612
DATED : November 27, 2012
INVENTOR(S) : Wagner It is certified that error appears in the above-identified patent and that said Letters Patent is hereby corrected as shown below:

In the Claims

In column 15 at line 7, In Claim 1, after "about" delete "a".

Signed and Sealed this
Twenty-third Day of April, 2013

Teresa Stanek Rea
*Acting Director of the United States Patent and Trademark Office*